July 5, 1932. F. HARRINGTON ET AL 1,866,465

FISH LURE

Filed March 24, 1931

Inventor
Fredrick Harrington,
Hiram Harrington,

By *Clarence A O'Brien*
Attorney

Patented July 5, 1932

1,866,465

UNITED STATES PATENT OFFICE

FREDRICK HARRINGTON AND HIRAM HARRINGTON, OF ST. CLOUD, MINNESOTA

FISH LURE

Application filed March 24, 1931. Serial No. 524,970.

This invention relates to improvements in fish lures, the general object of the invention being to provide a simple form of lure made to simulate somewhat a frog and which will have a swimming movement, as it is drawn through the water, so as to attract fish thereto.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing, wherein like characters denote like or corresponding parts throughout the several views, and in which:—

Figure 1:
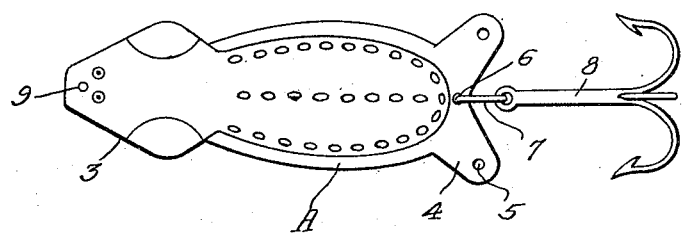
Figure 1 is a top plan view of the device.
Figure 2:
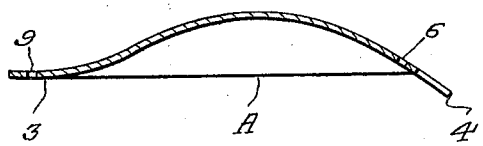
Fig. 2 is a longitudinal sectional view thereof.
Figure 3:
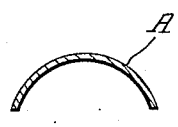
Fig. 3 is a cross sectional view.

As shown in these views, the lure A is formed of metal or the like, and comprises an elongated body made to simulate a frog, the major portion of the body being of substantially semi-circular shape of greater depth at its center and gradually tapered toward its edges with the front end flat and shaped to provide a head 3, preferably of the shape shown in Fig. 1.

The rear end of this device is provided with the diverging extensions 4, each of which is formed with a hole 5 and a hole 6 is formed in the middle part of the tail portion to receive the ring 7 to which the hook 8 is attached. A hole 9 is formed in the front part of the body to receive the line.

The body is painted or otherwise marked to imitate the markings on a frog as shown in Fig. 1.

As the device is pulled through the water it will be given a wobbling motion, due to the shape of the parts, and to the extensions 4, so that fish will be attracted thereto and as they strike at the lure, they will be caught by the hook 8.

It is thought from the foregoing description that the advantages and novel features of the invention will be readily apparent.

It is to be understood that changes may be made in the construction and in the combination and arrangement of the several parts, provided that such changes fall within the scope of the appended claim.

Having thus described our invention, what we claim as new is:—

A lure of the class described comprising an elongated body of substantially semi-circular shape in cross section, with the concavity gradually decreasing in depth from the center towards the ends, the front end of the body being flat and shaped to represent a head, curved diverging extensions at the tail end of the body, and a fish hook connected to the tail end of the body.

In testimony whereof we affix our signatures.

FREDRICK HARRINGTON.
HIRAM HARRINGTON.